April 13, 1965  A. DIXON  3,178,548

HIGH FREQUENCY HEATING METHOD AND APPARATUS

Filed Dec. 11, 1961

WITNESSES:
Bernard R. Gieguey
James F. Young

INVENTOR
Austin Dixon
BY D. F. Straitiff
AGENT

United States Patent Office 3,178,548
Patented Apr. 13, 1965

3,178,548
HIGH FREQUENCY HEATING METHOD
AND APPARATUS
Austin Dixon, Westmoreland City, Pa., assignor to Westinghouse Electric Corporation, East Pittsburgh, Pa., a corporation of Pennsylvania
Filed Dec. 11, 1961, Ser. No. 158,250
8 Claims. (Cl. 219—9.5)

This invention relates to a method and apparatus for high frequency electrical heating, and more particularly to such method and apparatus which is highly suitable for effecting a rapid soldering or brazing operation, for example.

In the heating of a workpiece element to be soldered to another element having no provision for fastening or holding the several elements together while soldering, separate hold-down fixtures have been provided to assure proper location of the soldered elements. This is ofttimes cumbersome and leads to waste of time. It therefore is an object of the present invention to provide a soldering tool which incorporates integral means enabling the hold-down of the several workpiece elements to be joined by solder.

In heating for soldering or brazing, for example, the time at which the workpiece elements are subjected to soldering temperature may be critical with respect to heat damage resulting from conduction to associated heat-sensitive components. It therefore becomes another object of the present invention to provide an apparatus and method which is operable to effect instantaneous soldering, for example, by rapid localized heating and which is also operable to effect rapid localized cooling of the workpiece elements.

In certain soldering situations it may be necessary to apply heat equally to both workpiece elements, and in other situations it may be desirable to apply the heat unequally, depending on thermal and other properties of the elements. It is a further object of the present invention to provide a method and apparatus which is capable of rapidly and simultaneously heating both of the workpiece elements, but which is susceptible to design and/or mode of operation for selection of the relative amounts of heat delivered to the two workpiece elements.

It is still a further object of the invention to provide a new and improved heating method and apparatus preferably employing a heat conducting workpiece contactor member which is heat-conductively and electrically joined to a water-cooled inductor and which is disposed to be heated by currents induced therein by the inductor as well as by current passing through the inductor. By virtue of this arrangement, direct application of heat to the workpiece element or elements by conduction from the workpiece contactor member is effected while being held in place by such member, and at the same time rapid eddy current heating of the workpiece elements also may be induced by the inductor with which such member is associated or forms a part of. The amount of heat applied to the workpiece by conduction relative to the amount created by induction can be determined by design, by the frequency of the alternating current power delivered to the inductor, the time of application of power to the inductor, etc. Upon termination of energization of the inductor, due to the circulation of cooling water through it, the workpiece elements are rapidly cooled by heat conduction via the heat-conducting workpiece contactor member to the water-cooled inductor, thus subjecting the workpiece elements to a heating effect for a controlled and limited period of time for effecting such as the soldering of a joint including the setting of the solder in a matter of a second or two. A soldering or brazing operation can be effected in a time-saving manner while greatly limiting the time at which the soldered elements are subjected to the soldering temperature.

Other features, objects and advantages of the invention will become apparent from the following detailed description of preferred embodiments of the invention, when taken in connection with the attached drawing, in which.

Figure 1:
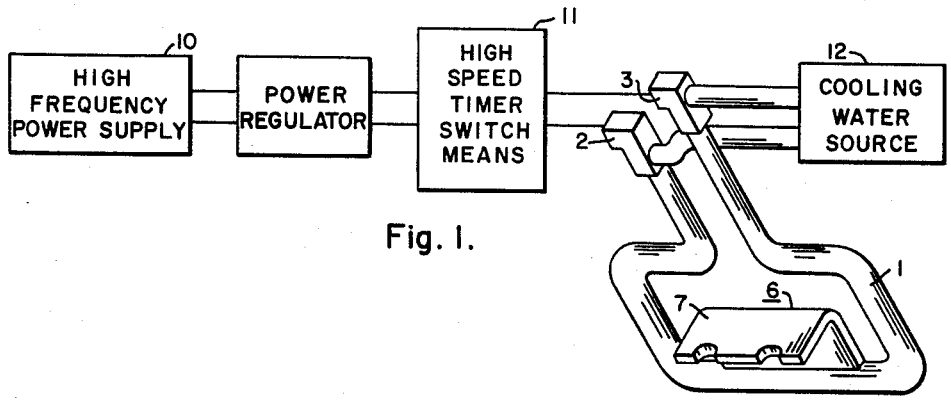
FIGURE 1 is a three-dimensional view of the heating apparatus for performing the novel method including a novel heating tool embodying features of the present invention.

Referring now to the drawings, a preferred novel apparatus for performing the method of the invention, for purposes of illustration, comprises an inductor in the form of a coil 1 of copper tubing having leads 2 and 3 for electrical connection to a high frequency alternating current power supply 10 via a high speed timer switch means 11 and to a circulating cooling water source 12.

Figure 2:
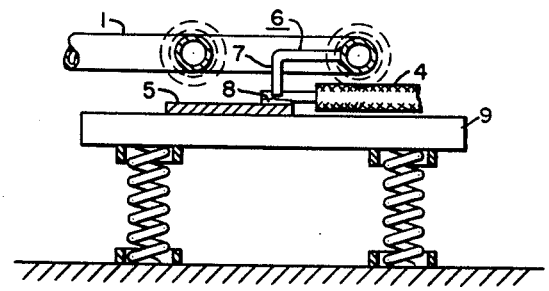
FIG. 2 is a side elevation view of the tool of FIG. 1 shown, in association with a workpiece support platen, in its operative position.

It appears that the frequency of the alternating current source may be chosen within a relatively wide range of perhaps from 10,000 cycles per second to several megacycles per second. The selected frequency, power level, and time of power application, as well as workpiece characteristics will affect the temperature and heat distribution within the workpiece elements. In the soldering of a relatively thin layer to a substrate to be protected from excessive heat, as in work with semiconductor materials for example, it may be desirable to employ a frequency within the megacycle region at a particular power level and application time, while for workpiece parts of grosser dimension and without temperature-sensitive criticality, the lesser frequencies may be employed. In a use involving the soldering of a workpiece element 4 in form of a wire (FIG. 2) to an element 5 in form of a thin sheet, the coil 1 was energized from a 10 kilowatt, 450 kilocycle source for a fraction of a second to complete in one second, a soldering cycle involving the localized heating of the elements 4 and 5 up to soldering temperature and the cooling down to substantially cooling water temperature.

In accordance with a feature of the invention, a heat-conducting workpiece contactor member 6 is employed, which may be of L-shaped cross section, brazed to one leg of the coil 1 and extending therefrom in the median plane of the coil to a position in which a workpiece-contacting leg 7 extends perpendicularly downward from the coil's central portion. During energization of the coil 1 with high frequency alternating current, the workpiece contactor member 6 including its leg 7 becomes heated both by induced currents as well as coil-energizing current and by heat-conducting and hold-down contact with a workpiece element, such as the bared end of wire 4 in FIG. 2, heats such element for such as the melting of solder 8 to form a soldered joint with such as the flat workpiece element 5. At the same time, the workpiece element 4 as well as element 5 may also be heated inductively by the coil 1, according to coil geometry relative to that of member 6 and to the mode of energization of such coil. The coil 1 may be energized for only a fraction of a second at the higher power levels in order to rapidly apply heat to the workpiece elements sufficient to melt the solder 8, after which the circulation of cooling water through such coil effects rapid cooling of the workpiece parts 4 and 5 and the solder 8 by heat conduction via the member 6.

The member 6 is made of a material such as cobalt steel to provide for rapid heating as well as to provide for a reasonably rapid heat conduction rate to and from the workpiece element which it contacts.

In accord with further features of the invention, a workpiece mounting platform 9 is provided to accept the workpiece element 5 to be soldered-to as well as to act as back-up for the clamping force exerted by member 6 on workpiece element 4. Platform 9 is arranged, as by spring mounting, to have freedom for rockable movement under influence of member 6 when in contact with the workpiece element 4 to afford an even distribution of hold-down force as well as maximum permissible heat-conducting contact between member 6 and the workpiece.

Figure 3:
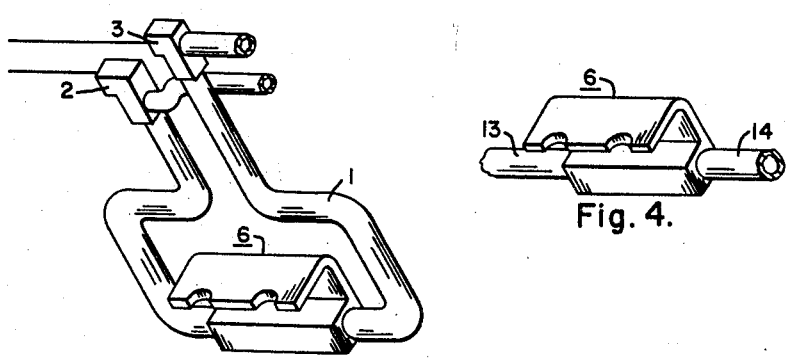
FIGS. 3 and 4 are three-dimensional views of alternate constructions of the heating tool.
Figure 4:
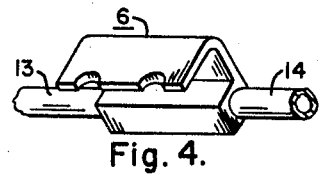

Further modified illustrative examples of the apparatus of this invention are shown in FIGS. 3 and 4. In FIG. 3, the workpiece contactor member 6 forms a part of the inductor coil 1, while in FIG. 4 the member 6 is divorced from any coil and is heated and cooled directly by the application of current and cooling water via such as tubing leads 13 and 14.

The invention has been described in connection with illustrative embodiments thereof. It will be appreciated, however, that it is my intention to include modifications and alterations which come within the scope of the appended claims.

I claim as my invention:

1. A soldering tool comprising a liquid-cooled inductor, and a heat-conducting workpiece contactor member in heat-conductive connection with said inductor and disposed for inductive heating thereby, said inductor and said member being constructed and arranged for conduction of heat from said member to a workpiece while the latter is also subject to an induction heating effect from said inductor, and for conduction of heat from the workpiece to said inductor while the latter is deenergized and subject to liquid cooling.

2. A soldering tool comprising an internally-cooled copper coil, and a workpiece hold-down and heat-conducting member of greater inductive heating capability than copper, said member being in heat-conductive electrical connection and in inductive coupling with said coil, said coil and said member being constructed and arranged for conduction of heat from said member to a workpiece while the latter is also subject to an induction heating effect from said coil and for conduction of heat from the workpiece to said coil while the latter is de-energized.

3. A heating tool comprising a hollow high frequency liquid-cooled coil, and a member adapted for heat-conductive contact with a workpiece to be momentarily heated, said member being in heat-conductive attachment to said coil and disposed to be heated inductively thereby, said coil and said member being constructed and arranged for conduction of heat from said member to a workpiece while the latter is also subject to an induction heating effect from said coil and for the conduction of heat from the workpiece to said coil while the latter is deenergized.

4. A heating tool comprising a high frequency water-cooled coil, and a heat-conducting workpiece contactor member of magnetic material in heat-conducting attachment and inductive coupling with said coil, said coil and said member being constructed and arranged for conduction of heat from said member to a workpiece while the latter is also subject to an induction heating effect from said coil and for conduction of heat from the workpiece to said coil while the latter is deenergized.

5. A soldering tool comprising a high frequency water-cooled copper coil of rectangular shape; and a ferrous workpiece hold-down and heat-conducting element of L-shaped configuration having a first leg disposed in the plane of said coil in heat-conductive and electrical-conductive attachment thereto, and having another leg extending perpendicularly from said first leg at the central portion of said coil, the projecting end of said second leg being adapted according to the configuration of a workpiece for effective heat-conducting contact therewith.

6. A heating tool comprising an induction heating coil, a workpiece hold-down and heat-conducting element inductively coupled to said coil in heat-conducting attachment thereto, said coil and said member being constructed and arranged for conduction of heat from said member to a workpiece while the latter is also subject to an induction heating effect from said coil and for conduction of heat from the workpiece to said coil while the latter is deenergized, and a yieldable workpiece support platen for backup during engagement of said member with a workpiece.

7. A method for the rapid heating and cooling of an inductively-heatable workpiece, comprising subjecting the workpiece simultaneously to an induction field creative of heating currents therein and to heat-conductive association with an induction-heatable heat-conductable element which is in subjection to a forced cooling effect as well as in subjection to heating by such field in preponderance over such cooling effect, and subsequently disrupting such induction field to terminate heat creation while maintaining the heat conductive association for withdrawal of heat from the workpiece via such medium while the latter remains subject to the forced cooling effect.

8. An apparatus comprising a high frequency power source, a circulating cooling water system, an induction heating coil and a member both in heat-extractive association with said cooling water system and heatable by flow of current therethrough from said source at a rate in excess of the rate of heat extraction therefrom to said cooling water system, said member being constructed and arranged for heat-conducting engagement with a workpiece while both said member and said workpiece are subject to inductive heating by said coil when energized, and high-speed timing switch means for the rapid turn-on and turn-off of power from said power source to said coil and member while the latter is engaging a workpiece to be consecutively rapidly heated and cooled thereby.

References Cited by the Examiner
UNITED STATES PATENTS

| | | | |
|---|---|---|---|
| 2,513,376 | 7/50 | Strickland | 219—10.79 |
| 2,621,704 | 12/52 | Langer | 219—540 |
| 2,648,759 | 8/53 | Machian et al. | 219—10.79 |
| 2,693,636 | 11/54 | Simpelaar | 219—85 |
| 2,765,361 | 10/56 | Capita | 219—39.25 |
| 2,857,503 | 10/58 | Rudd et al. | 219—59 |
| 2,901,583 | 8/59 | Klooz | 219—10.49 |
| 2,966,571 | 12/60 | Markert | 219—9.5 |
| 2,984,732 | 5/61 | Herbert | 219—85 |
| 3,047,710 | 7/62 | Rowe | 219—85 |
| 3,064,118 | 11/62 | Bukata | 219—85 |
| 3,109,909 | 11/63 | McBrien | 219—10.79 |

RICHARD M. WOOD, *Primary Examiner.*

MAX L. LEVY, *Examiner.*